(12) United States Patent
Zhang

(10) Patent No.: US 9,834,243 B1
(45) Date of Patent: Dec. 5, 2017

(54) COLLAPSIBLE BABY CARRIAGE

(71) Applicant: DONG GUAN JIA LIAN KIDS PRODUCTS CO., LTD., Dong Guan, Guang Dong Province (CN)

(72) Inventor: Qiang Zhang, Dong Guan (CN)

(73) Assignee: Dong Guan Jia Lian Kids Products Co., Ltd., Dong Guan, Guang Dong Province (CN)

( * ) Notice: Subject to any disclaimer, the term of this patent is extended or adjusted under 35 U.S.C. 154(b) by 0 days.

(21) Appl. No.: 15/487,732

(22) Filed: Apr. 14, 2017

(51) Int. Cl.
    *B62B 3/00* (2006.01)
    *B62B 7/08* (2006.01)

(52) U.S. Cl.
    CPC .......... *B62B 7/086* (2013.01); *B62B 2205/04* (2013.01)

(58) Field of Classification Search
    CPC .. B62B 7/086; B62B 7/00; B62B 7/08; B62B 7/06; B62B 7/10; B62B 2205/04
    See application file for complete search history.

(56) References Cited

U.S. PATENT DOCUMENTS

| | | | | |
|---|---|---|---|---|
| 2,170,227 A * | 8/1939 | Weber | ....................... | B62B 7/10 280/37 |
| 2,429,763 A * | 10/1947 | Lindabury | ................ | B62B 7/08 280/37 |
| 2,549,958 A * | 4/1951 | Bosk | ......................... | B62B 7/10 280/37 |
| 3,365,210 A * | 1/1968 | Patterson | .................. | B62B 7/08 280/644 |
| 4,506,907 A * | 3/1985 | Miyagi | ..................... | B62B 7/08 280/642 |
| 4,632,420 A * | 12/1986 | Miyagi | ..................... | B62B 7/08 280/47.39 |
| 4,763,911 A * | 8/1988 | Gebhard | ................... | B62B 7/08 280/37 |
| 6,155,740 A * | 12/2000 | Hartenstine | .............. | B62B 7/08 280/38 |
| 6,220,621 B1 * | 4/2001 | Newton | ................ | B62B 5/0023 280/650 |
| 9,415,790 B2 * | 8/2016 | Driessen | ................... | B62B 7/08 |
| 9,517,788 B2 * | 12/2016 | He | .......................... | B62B 7/086 |
| 9,545,938 B2 * | 1/2017 | Liu | ........................... | B62B 7/08 |
| 9,604,660 B1 * | 3/2017 | Zuo | ........................... | B62B 7/12 |

\* cited by examiner

*Primary Examiner* — James M Dolak
(74) *Attorney, Agent, or Firm* — Muncy, Geissler, Olds & Lowe, P.C.

(57) ABSTRACT

A collapsible baby carriage includes a pair of middle pushing rod, a pair of upper pushing rod, a pair of T-rod, a pair of front wheel rod, a pair of bending-extension rod, a pair of side sliding rod, a pair of handle and a pair of seat side bending rod at two sides thereof. A top pushing rod, a seat bottom rod, a bottom connecting rod, a front wheel bottom rod and a rear wheel bottom rod are also between two sides of the baby carriage. The baby carriage includes a folding mechanism. The folding mechanism turns the upper pushing rod upward and the middle pushing rod and the front wheel rod downward. The flipping mechanism flips the seat side bending rods, the bending-extension rods, the front wheel rods, the front wheels, the handles, the T-rods and the rear wheels inward, forming a flat and rectangular body.

5 Claims, 14 Drawing Sheets

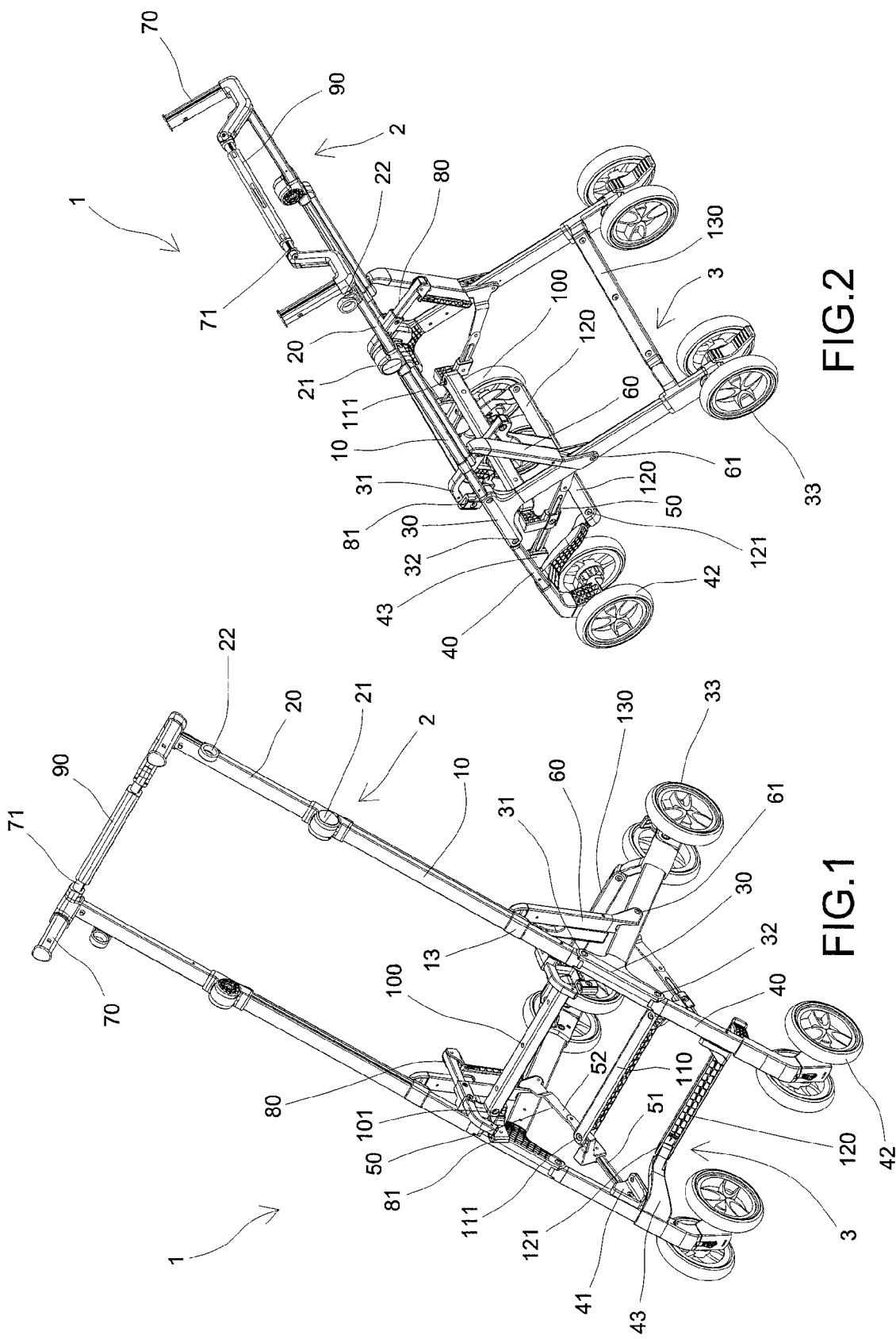

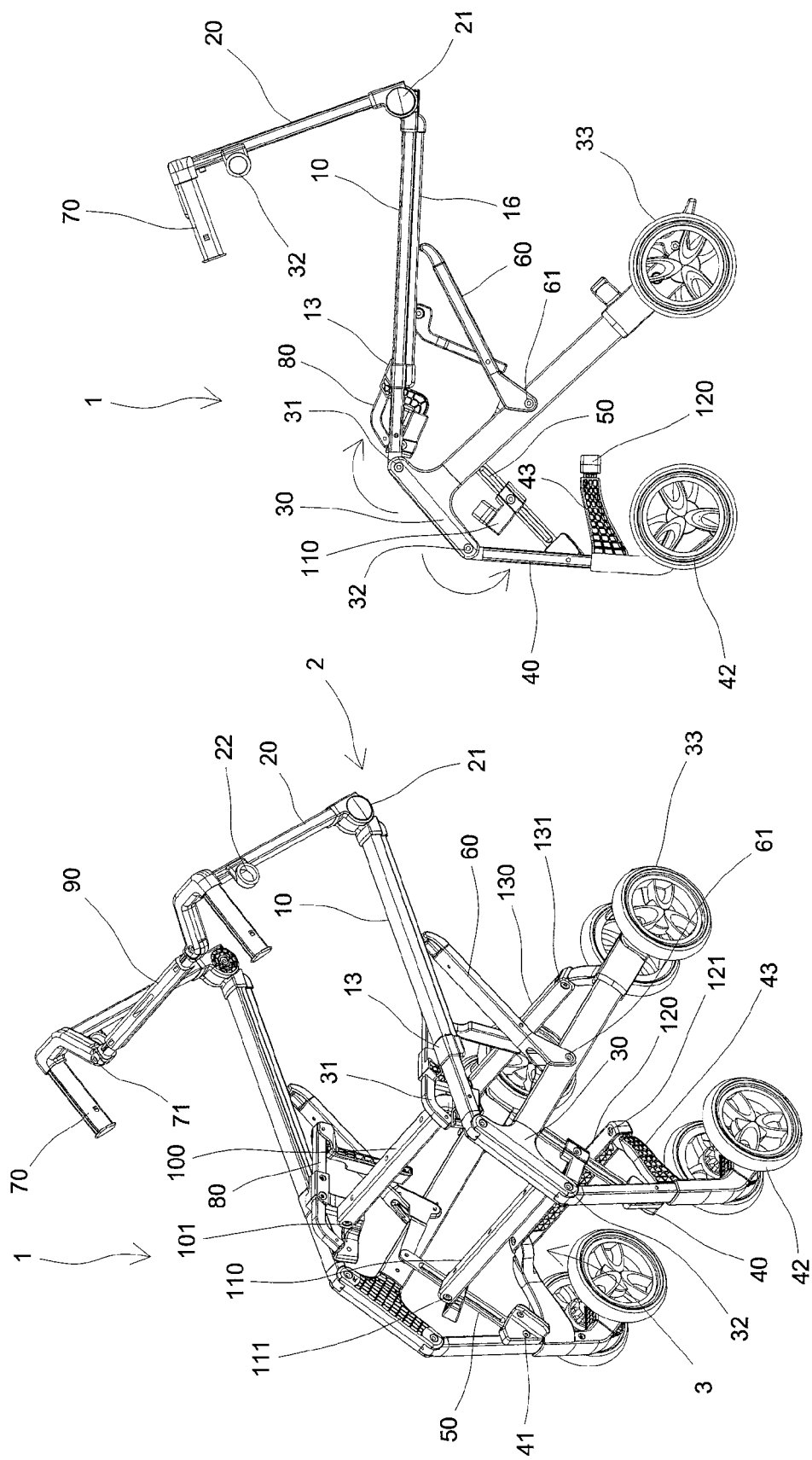

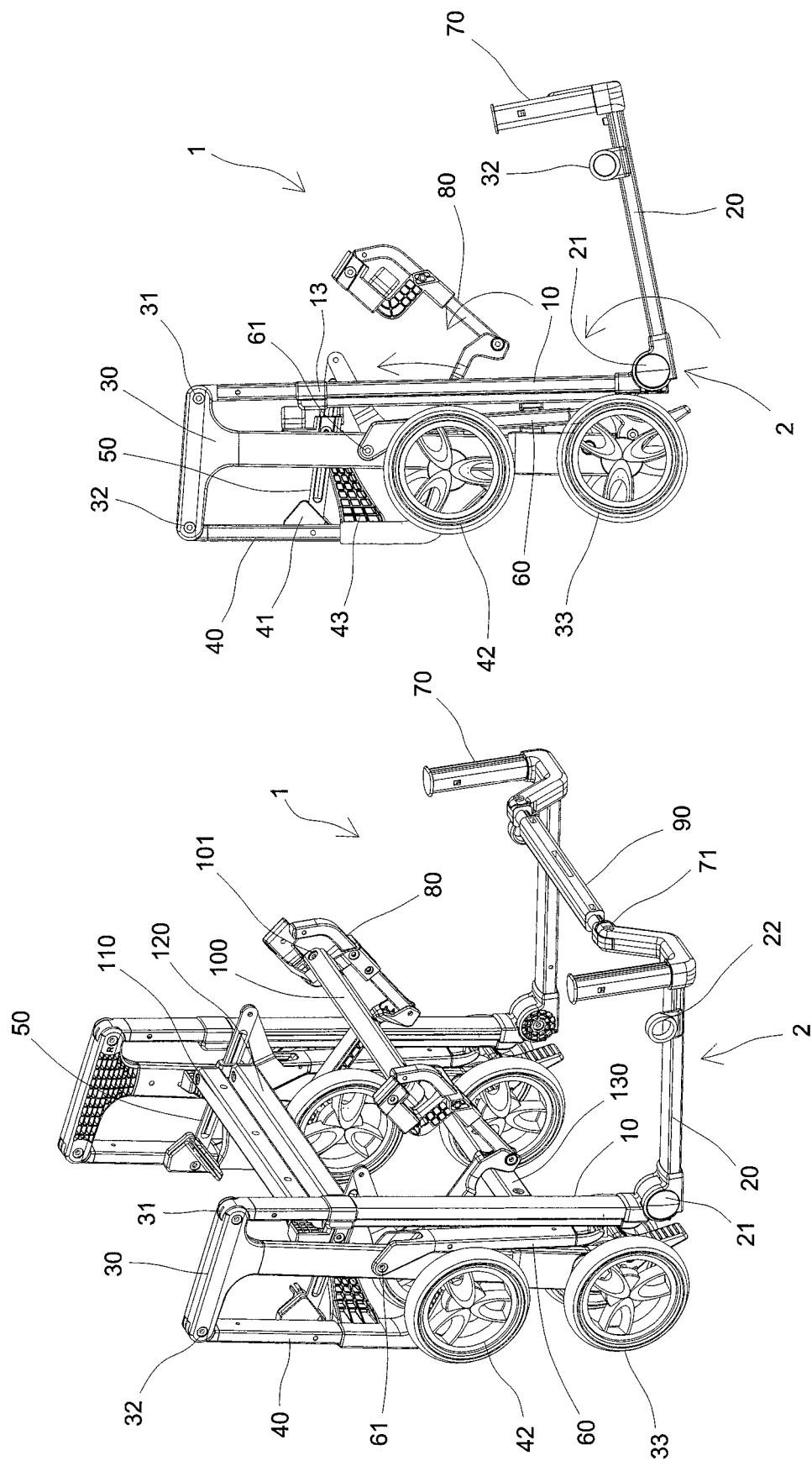

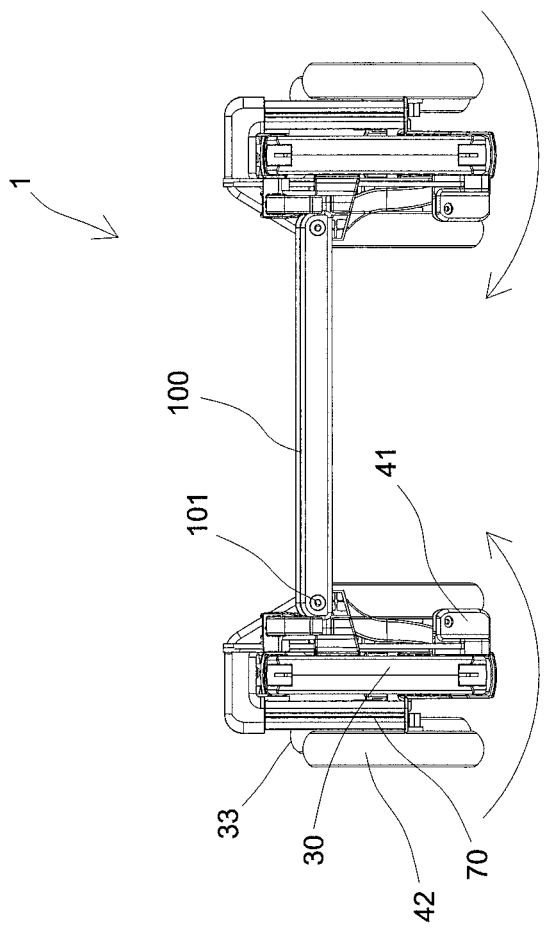
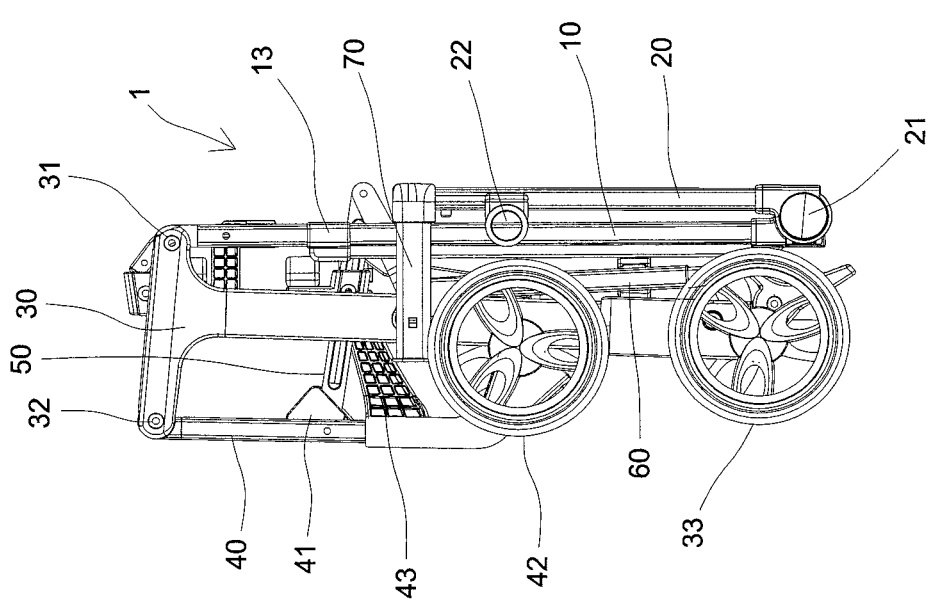

COLLAPSIBLE BABY CARRIAGE

BACKGROUND OF THE INVENTION a) Field of the Invention

The present invention relates to a collapsible baby carriage, and more particularly to a collapsible baby carriage which can be first folded into a U-shaped body by exerting a forward-backward force and is then flipped inward to form a flat and rectangular body. The size of the collapsible baby carriage after folding is therefore reduced significantly to facilitate transporting, collecting and carrying, and the folding is operated easily without requiring a complicated operating procedure.

b) Description of the Prior Art

A baby carriage can be used to carry a baby, facilitating a caregiver to push the baby outdoors by the carriage with hands. The baby carriage is a facilitated and safe device to carry the baby outdoors and can be folded for transporting or collecting in a small size, which is very convenient. Upon folding an existing baby carriage, the latches are escaped from the grooves primarily, and the straight push bars are released to form a bendable device, which facilitates folding to decrease the size. However, the folded baby carriage that has been shrunk is still quite large, and for most of the conventional baby carriages, the two crossed rods are collapsed from an open state; therefore, the width of the baby carriage after folding is still the same and only the height is reduced. Although the folded baby carriage can be contained in a vehicle, the front wheels and the rear wheels cannot be flipped and collapsed. Thus, the folded baby carriage is still large in size, which is not convenient in carrying, transporting or collecting by the caregiver.

A conventional baby carriage can be folded for collection. But, the size of the baby carriage after folding is still large and the wheels cannot be flipped and collapsed inward. Therefore, the baby carriage cannot be shrunk to a minimum size effectively, thereby troubling the caregiver.

SUMMARY OF THE INVENTION

Accordingly, the present invention discloses a collapsible baby carriage which includes a pair of middle pushing rod, a pair of upper pushing rod, a pair of T-rod, a pair of front wheel rod, a pair of bending-extension rod, a pair of side sliding rod, a pair of handle and a pair of seat side bending rod at two sides of the baby carriage. A front section of the bending-extension rod can be extended and a rear section of the bending-extension rod is bendable. The seat side bending rod is bendable and a front end thereof is provided with a socket. A top pushing rod, a seat bottom rod, a bottom connecting rod, a front wheel bottom rod and a rear wheel bottom rod are disposed between two sides of the baby carriage.

The present invention is characterized in that the collapsible baby carriage is provided with a folding mechanism and a flipping mechanism, wherein the folding mechanism includes a pair of pivoting head, a pair of first pivoting axis, a pair of second pivoting axis, a pair of third pivoting axis and the pair of bending-extension rod. The pivoting head is disposed above the middle pushing rod and is pivoted with the upper pushing rod. A top of each upper pushing rod is connected with the top pushing rod, two ends of the top pushing rod are pivoted respectively with the handle, and the upper pushing rod is provided with a sliding shaft ring. The pivoting head can be released by moving the sliding shaft ring, allowing the upper pushing rod and the middle pushing rod to turn relative to each other.

An end of the T-rod is provided with a first pivoting axis to pivot with the middle pushing rod, so that the middle pushing rod can be pressed down and turn from the T-rod. The other end of the T-rod is provided with a second pivoting axis to pivot with the front wheel rod, so that the front wheel rod can be indented inward and turn from the T-rod. A middle section at a tail end of the T-rod is provided with a third pivoting axis to pivot with the side sliding rod, and a bottom end of the T-rod is pivoted with a rear wheel. A tail end of the front wheel rod is pivoted with a front wheel, and a front wheel bottom rod is disposed between the two front wheel rods. The front wheel rod and an interior side at a middle section of the T-rod are pivoted respectively with the bending-extension rod, the bottom connecting rod is disposed between the two bending-extension rods, and the rear wheel bottom rod is disposed between the two T-rods.

A sliding mechanism is disposed between the top end of the side sliding rod and the middle pushing rod. The top end of the side sliding rod can slide following the middle pushing rod. An interior side of the side sliding rod is pivoted with a seat side bending rod, and a seat bottom rod is pivoted between the two seat side bending rods.

The flipping mechanism includes a set of top flipping axis, a set of seat flipping axis, a set of bottom flipping axis, a set of front wheel flipping axis and a set of rear wheel flipping axis. The top flipping axes are disposed between the top pushing rod and the two handles, the seat flipping axes are disposed between the two seat side bending rods and the seat bottom rod, the bottom flipping axes are disposed between the two bending-extension rods and the bottom connecting rod, the front wheel flipping axes are disposed between the two front wheel rods and the front wheel bottom rod, and the rear wheel flipping axes are disposed between the two T-rods and the rear wheel bottom rod.

The primary object of the present invention is to provide a collapsible baby carriage which can be folded first into a U-shaped body by exerting a forward-backward force and is then flipped inward to form a flat and rectangular body. The size of the collapsible baby carriage after folding is therefore reduced significantly to facilitate transporting, collecting and carrying, and the folding can be operated easily without requiring a complicated operating procedure.

To enable a further understanding of the said objectives and the technological methods of the invention herein, the brief description of the drawings below is followed by the detailed description of the preferred embodiments.

BRIEF DESCRIPTION OF THE DRAWINGS

FIG. 1 shows a three-dimensional front view of the present invention.

FIG. 2 shows a three-dimensional rear view of the present invention.

FIG. 11 shows a three-dimensional view of a first folding operation of the present invention.

FIG. 12 shows a planar view of the first folding operation of the present invention.

FIG. 13 shows a three-dimensional view of a second folding operation of the present invention.

FIG. 14 shows a planar view of the second folding operation of the present invention.

FIG. 15 shows a side planar view of a third folding operation of the present invention.

FIG. 16 shows a top planar view of the third folding operation of the present invention.

DETAILED DESCRIPTION OF THE PREFERRED EMBODIMENTS

Figure 3:
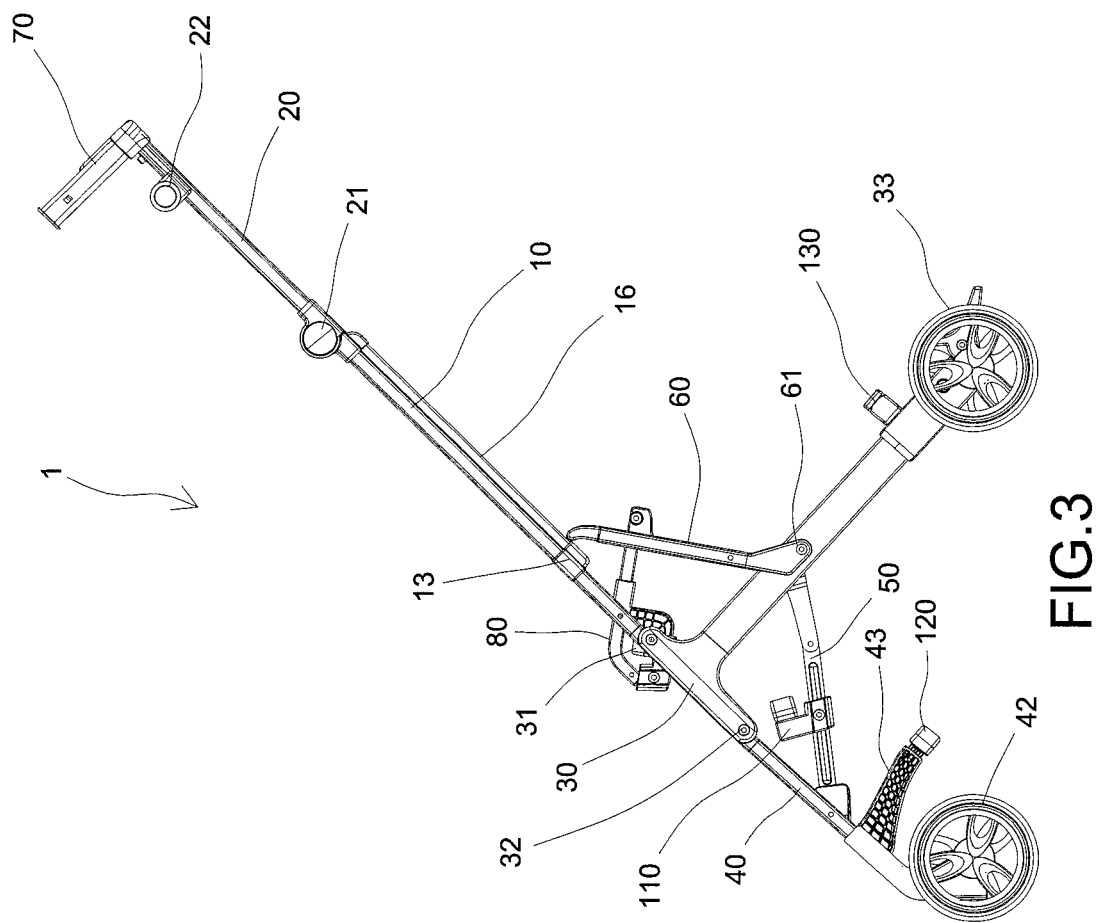
FIG. 3 shows a side planar view of the present invention.

The present invention discloses a collapsible baby carriage. As shown in FIGS. 1 to 3, a baby carriage 1 comprises primarily a pair of middle pushing rod 10, a pair of upper pushing rod 20, a pair of T-rod 30, a pair of front wheel rod 40, a pair of bending-extension rod 50, a pair of side sliding rod 60, a pair of handle 70 and a pair of seat side bending rod 80 at two sides of the baby carriage 1. A front section 51 of the bending-extension rod 50 is a pneumatic extension rod, and a rear section 52 of the bending-extension rod 50 is bendable. The seat side bending rod 80 is bendable and a front end thereof is provided with a socket 81. Each of the two front wheel rods 40 is fixed with a connecting board 41, and the socket 81 and the connecting board 41 provide for positioning with a baby seat (not shown in the drawings). A top pushing rod 90, a seat bottom rod 100, a bottom connecting rod 110, a front wheel bottom rod 120 and a rear wheel bottom rod 130 are disposed between two sides of the baby carriage 1. The baby carriage 1 also includes a folding mechanism 2 and a flipping mechanism 3. The folding mechanism 2 enables the baby carriage 1 to be folded forward and backward, whereas the flipping mechanism 3 is then flipped inward, forming the baby carriage 1 into a flat and rectangular body.

Figure 4:
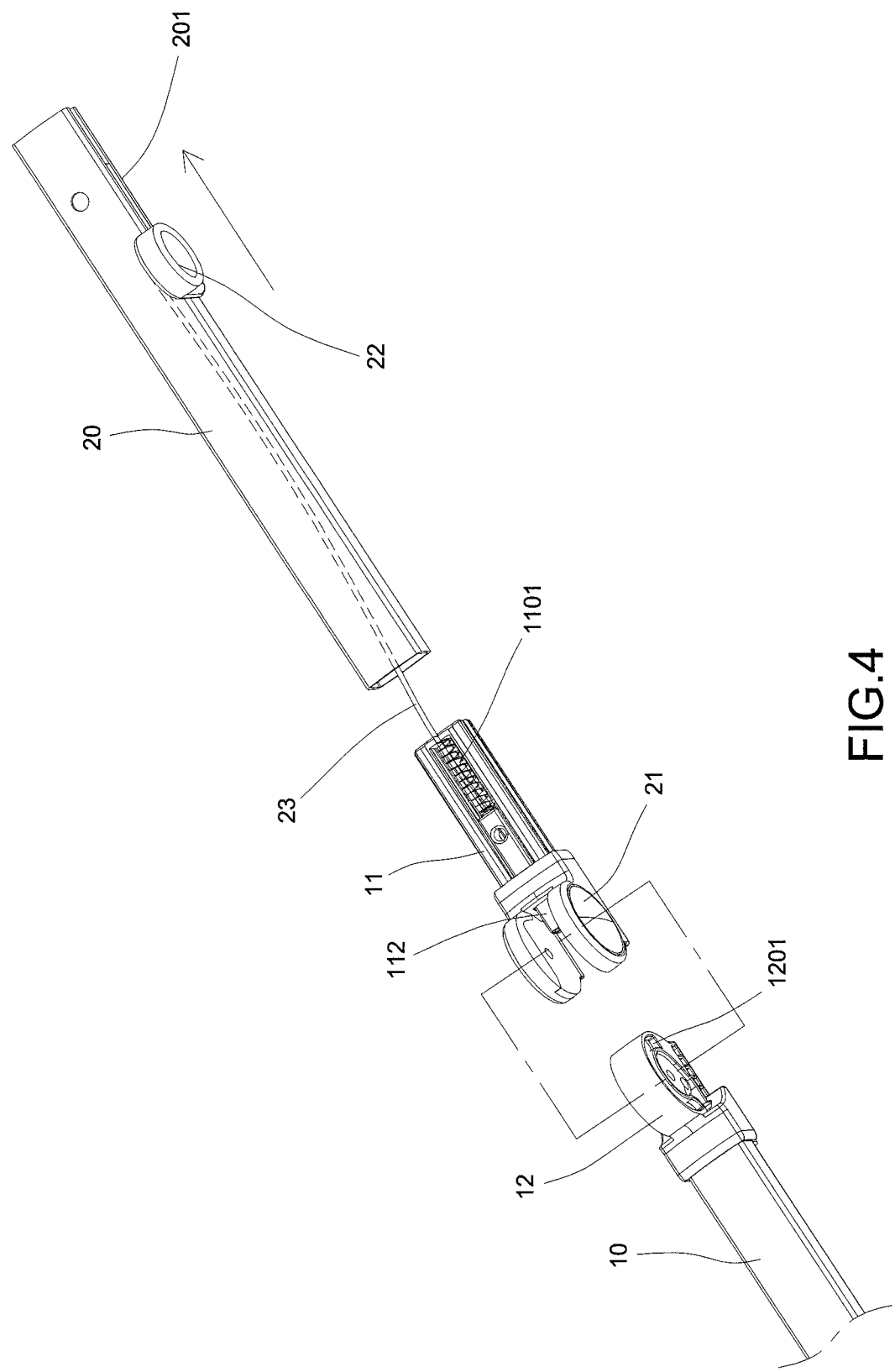
FIG. 4 shows a three-dimensional exploded view of a middle pushing rod and an upper pushing rod, according to the present invention.
Figure 5:
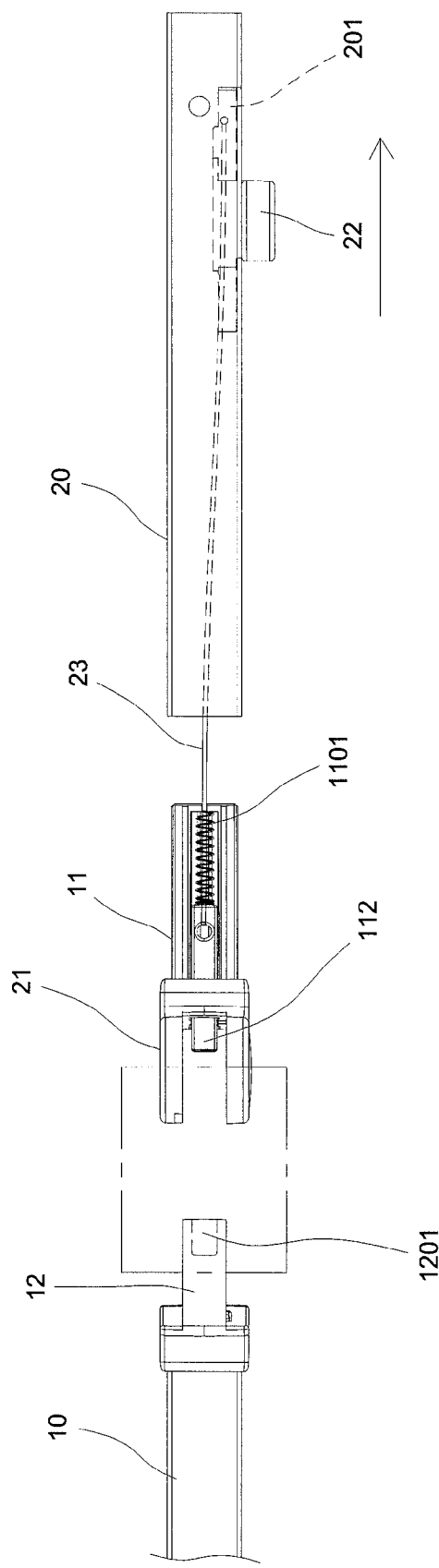
FIG. 5 shows a planar exploded view of the middle pushing rod and the upper pushing rod, according to the present invention.
Figure 6:
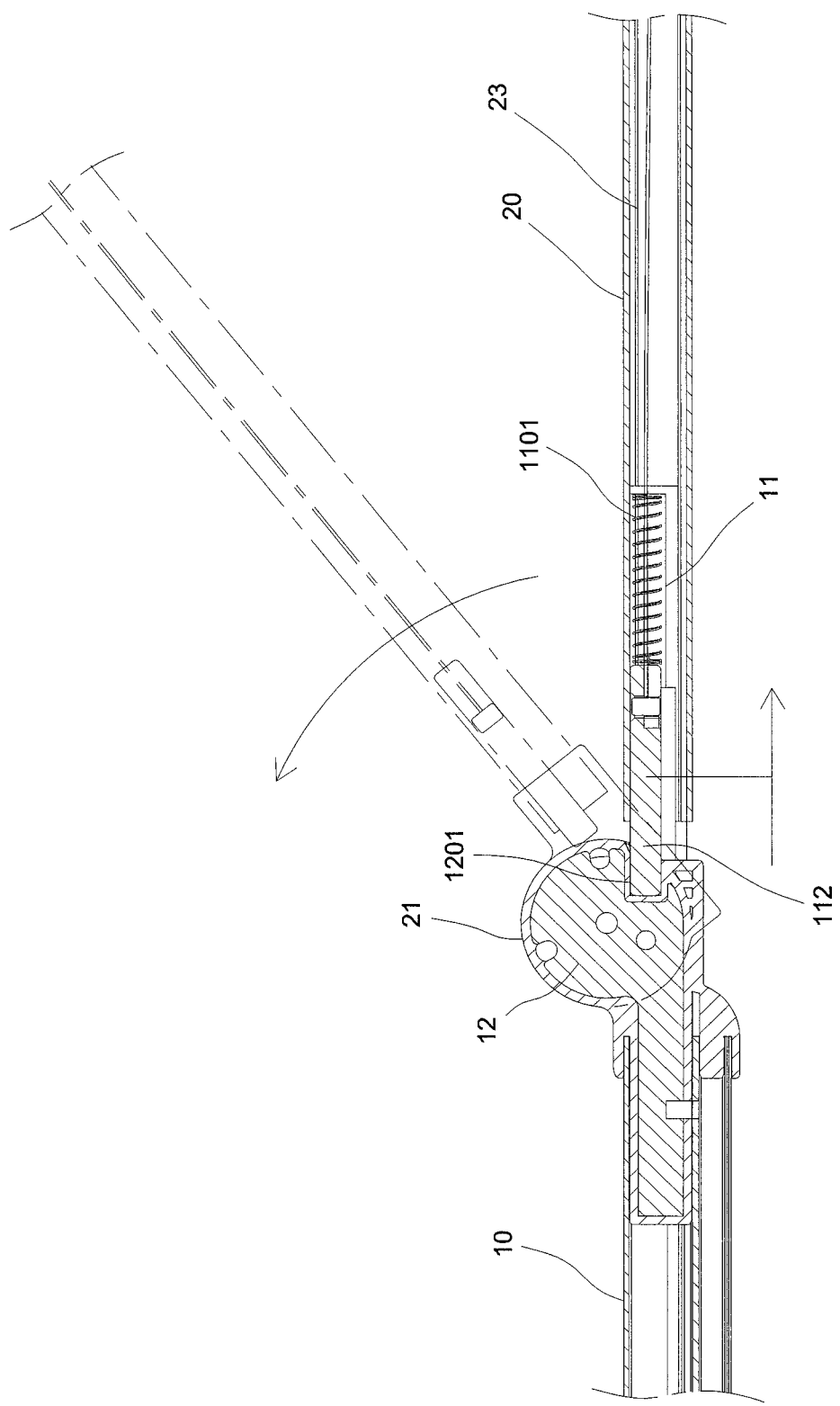
FIG. 6 shows a cutaway view of an action that the upper pushing rod moves from the middle pushing rod, according to the present invention.
Figure 8:
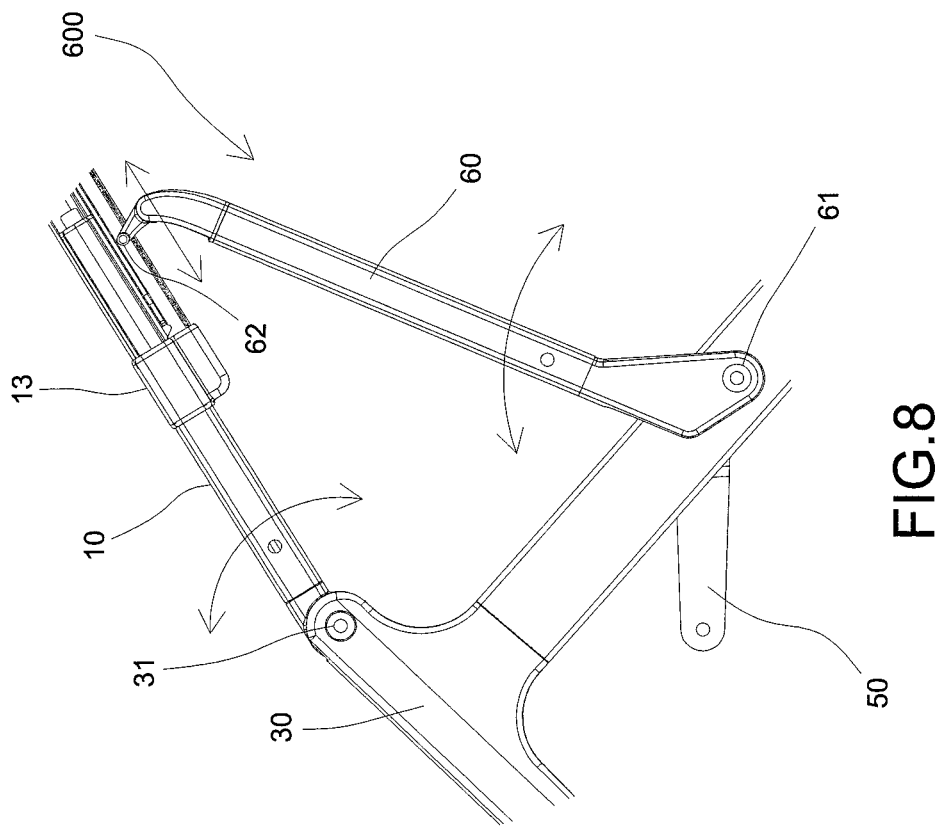
FIG. 8 shows a planar view of the sliding mechanism of the present invention.
Figure 7:
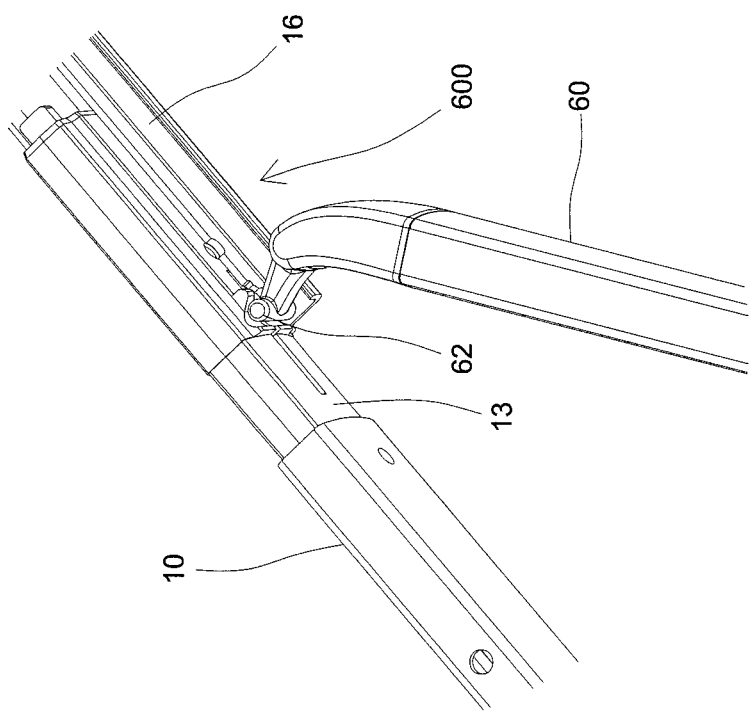
FIG. 7 shows a three-dimensional view of a sliding mechanism of the present invention.
Figure 9:
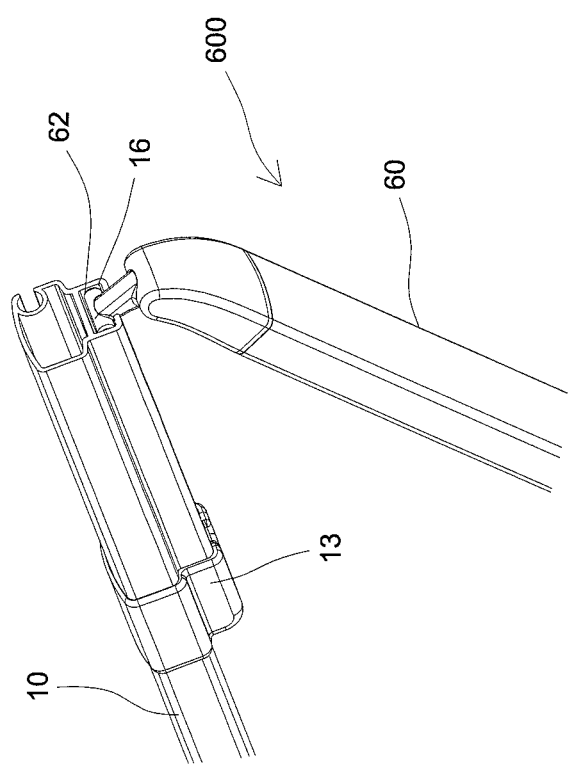
FIG. 9 shows a three-dimensional view of an operation of the sliding mechanism, according to the present invention.

The folding mechanism 2 includes a pair of pivoting head 21, a pair of first pivoting axis 31, a pair of second pivoting axis 32, a pair of third pivoting axis 61 and the pair of bending-extension rod 50. The pivoting head 21 is disposed above the middle pushing rod 10 and is pivoted with the upper pushing rod 20. A top of each upper pushing rod 20 is connected with the top pushing rod 90, two ends of the top pushing rod 90 are pivoted respectively with the handle 70, and the upper pushing rod 20 is provided with a sliding shaft ring 22. The pivoting head 21 can be released by moving the sliding shaft ring 22, allowing the upper pushing rod 20 and the middle pushing rod 10 to turn relative to each other. Referring to FIGS. 4 to 6, the upper pushing rod 20 is provided with a slot hole 201 which provides for the movement of the sliding shaft ring 22, and the sliding shaft ring 22 is fixed with a rope 23. A shaft tube 11 is disposed between the upper pushing rod 20 and the middle pushing rod 10. An end of the shaft tube 11 is fixed in the upper pushing rod 20, whereas the other end of the shaft tube 11 is connected with the middle pushing rod 10 by the pivoting head 21. The middle pushing rod 10 is provided with a pivoting ring 12 to pivot with the pivoting head 21, and the pivoting ring 12 is provided with a latch groove 1201. An interior of the shaft tube 11 is provided with a spring 1101 and a latch bolt 112. The latch bolt 112 is connected with the rope 23, and can be restored to an original position by the spring 1101. The latch bolt 112 is engaged in the latch groove 1201 of the pivoting ring 12, and can be escaped from the latch groove 1201 by pulling the sliding shaft ring 22, so that the upper pushing rod 20 can turn upward from the middle pushing rod 10.

Referring to FIG. 1 to FIG. 3, the first pivoting axis 31 is disposed at an end of the T-rod 30 and is pivoted with the middle pushing rod 10, so that the middle pushing rod 10 can be pressed down and turn from the T-rod 30. The second pivoting axis 32 is disposed at the other end of the T-rod 30 and is pivoted with the front wheel rod 40, so that the front wheel rod 40 can turn downward from the T-rod 30. The third pivoting axis 61 is disposed at a middle section of the T-rod 30 and is pivoted with the side sliding rod 60. A bottom at the middle section of the T-rod 30 is pivoted with a rear wheel 33 (dual wheel), and a tail end of the front wheel rod 40 is pivoted with a front wheel 42 (dual wheel). The front wheel bottom rod 120 is disposed between the two front wheel rods 40. The front wheel bottom rod 120 and an interior side at the middle section of the T-rod 30 are pivoted respectively with the bending-extension rod 50, the bottom connecting rod 110 is disposed between the two bending-extension rods 50, and the rear wheel bottom rod 130 is disposed between the two T-rods 30.

Referring to FIGS. 7 to 10, a stopping piece 13 is disposed near a lower end of the middle pushing rod 10. The stopping piece 13 is a sleeve which encloses and is fixed with the middle pushing rod 10 and is exposed out of the middle pushing rod 10. The stopping piece 13 is able to stop a top end of the side sliding rod 60 from moving downward continuously. A sliding mechanism 600 is disposed between a top end 62 of the side sliding rod 60 and the middle pushing rod 10. A bottom surface of the middle pushing rod 10 is provided with a locating groove 14, a slope 15 and a dovetail groove 16 in a shape of a long strip. The depth of the locating groove 14 is lower than the dovetail groove 16, and the slope 15 is higher than the locating groove 14. The top end 62 of the side sliding rod 60 is a T-end which enters into the dovetail groove 16, and a head of the T-end is a transversal pillar which can be positioned in the locating groove 14. The top end 62 of the side sliding rod 60 can slide following the middle pushing rod 10. An interior side of the side sliding rod 60 is pivoted with the seat side bending rod 80 (as shown in FIG. 1 and FIG. 2), and the seat bottom rod 100 is pivoted between the two seat side bending rods 80 (as shown in FIG. 1 and FIG. 2).

Referring to FIG. 11, the flipping mechanism 3 includes a set of top flipping axis 71, a set of seat flipping axis 101, a set of bottom flipping axis 111, a set of front wheel flipping axis 121 and a set of rear wheel flipping axis 131. The top flipping axes 71 are pivoted between two ends of the top pushing rod 90 and the handles 70, allowing the handles 70 to be flipped inward. The seat flipping axes 101 are pivoted between the seat side bending rods 80 and two sides of the seat bottom rod 100, allowing the seat side bending rods 80 to be flipped inward. The bottom flipping axes 111 are pivoted between the bending-extension rods 50 and two sides of the bottom connecting rod 110, allowing the bending-extension rods 50 to be flipped inward. The front wheel flipping axes 121 are pivoted between the front wheel bottom rod 120 and two arm extensions 43 at two sides of the front wheel rods 40, allowing the front wheel rods 40 and the front wheels 42 to be flipped inward altogether. Other flipping mechanisms 3 are also provided with the similar arm extensions for pivoting with the axes. The rear wheel flipping axes 131 are pivoted between the middle sections of the T-rods 30 and two sides of the rear wheel bottom rod 130, allowing the middle sections of the T-rods 30 and the rear wheels 33 to be flipped inward altogether.

Figure 10:
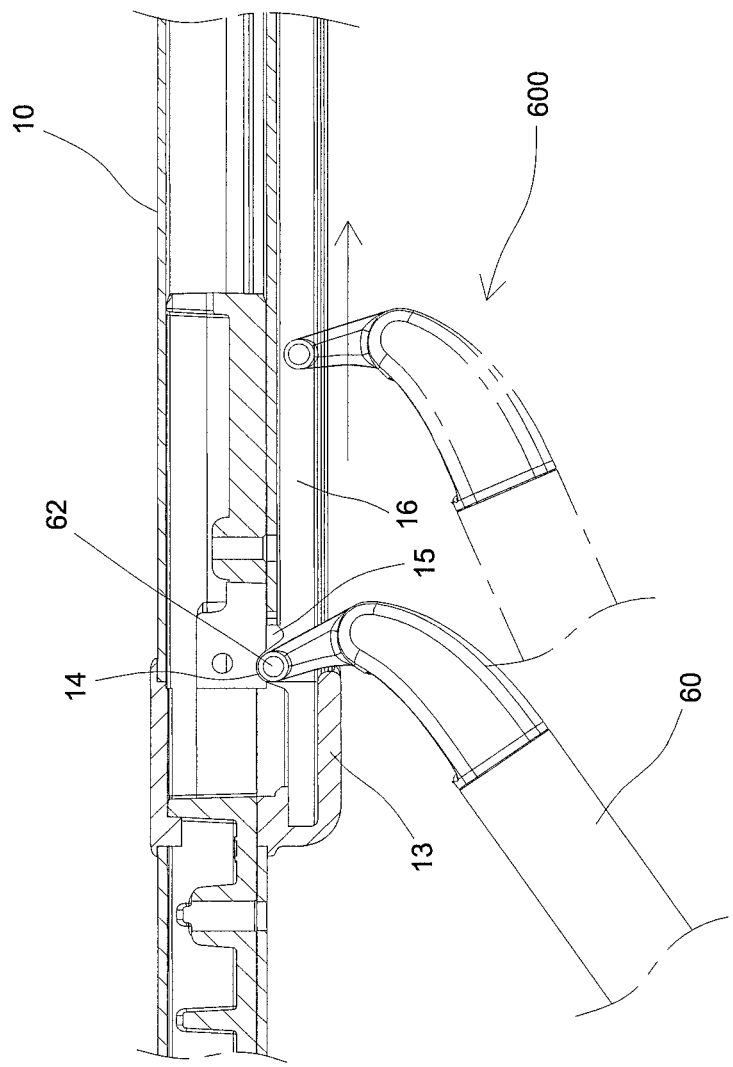
FIG. 10 shows a cutaway view of the operation of the sliding mechanism, according to the present invention.
Figure 18:
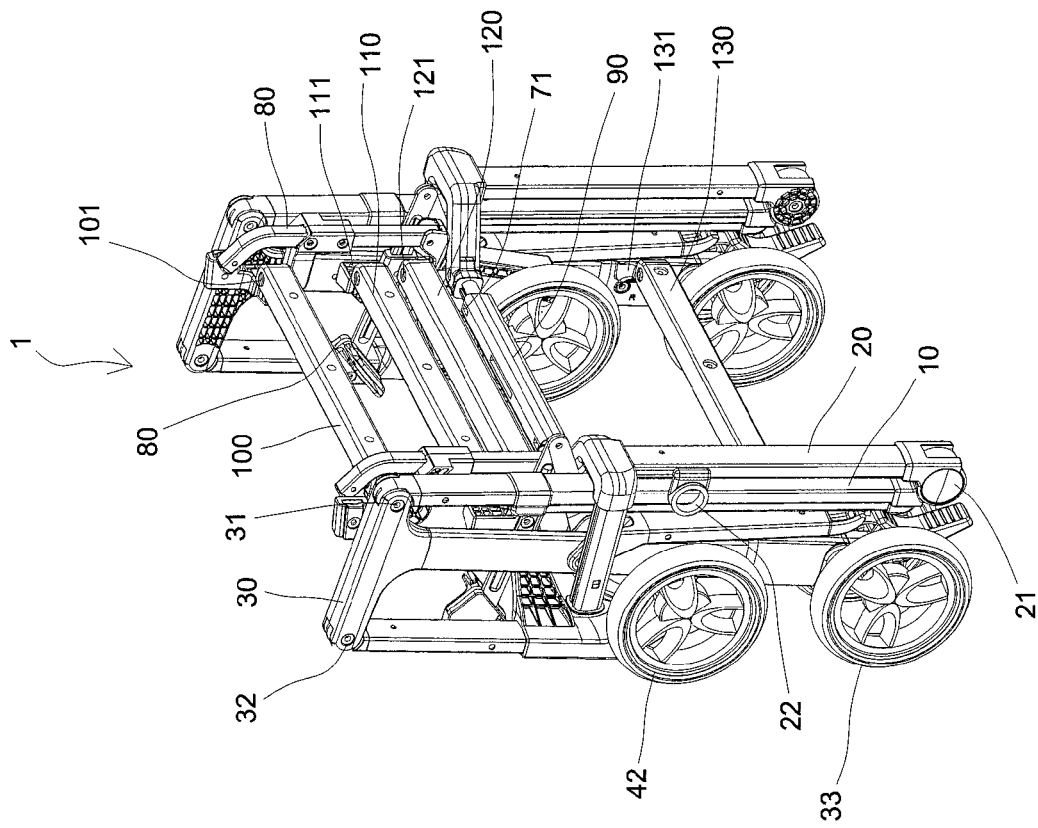
FIG. 18 shows a three-dimensional rear view of the third folding operation of the present invention.
Figure 17:
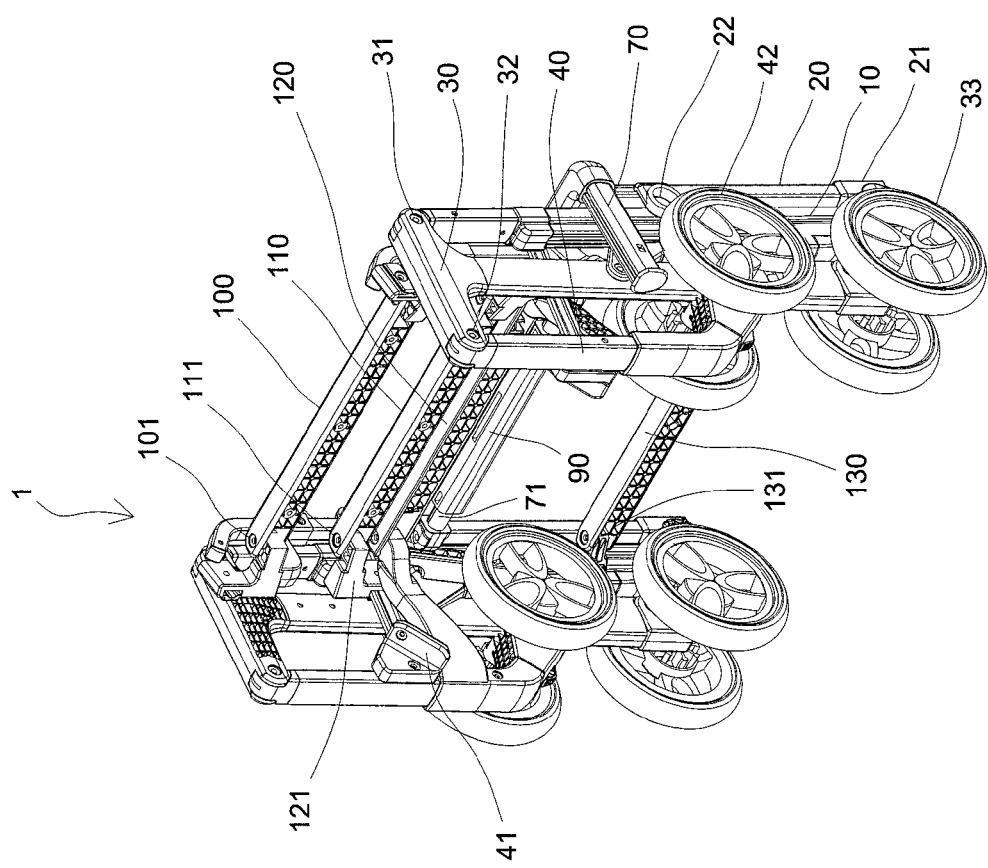
FIG. 17 shows a three-dimensional front view of the third folding operation of the present invention.
Figure 20:
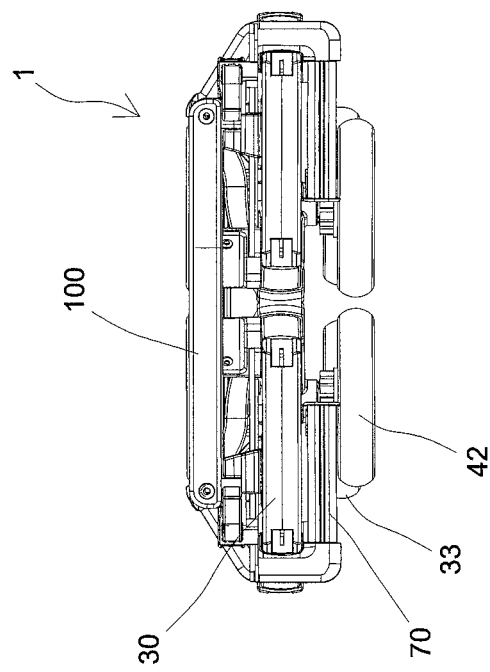
FIG. 20 shows a top planar view of the flipping operation of the present invention.
Figure 19:
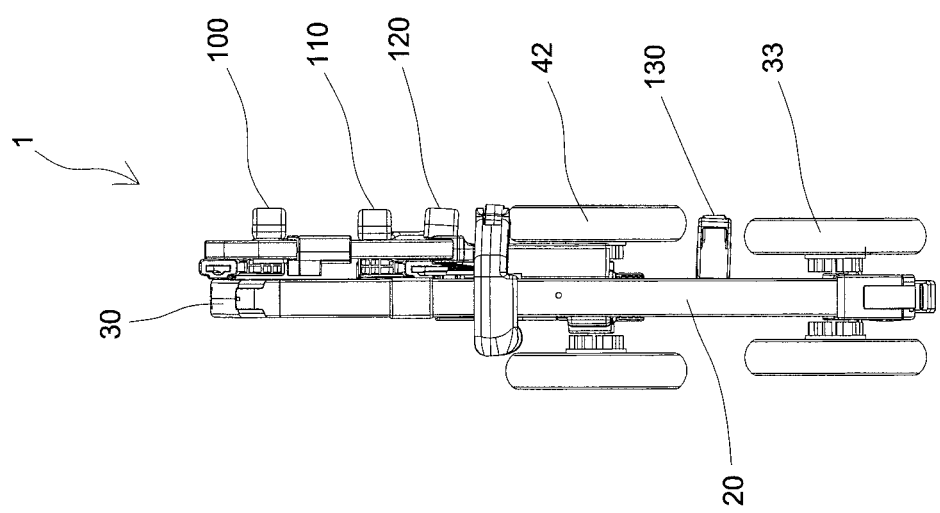
FIG. 19 shows a side planar view of a flipping operation of the present invention.
Figure 22:
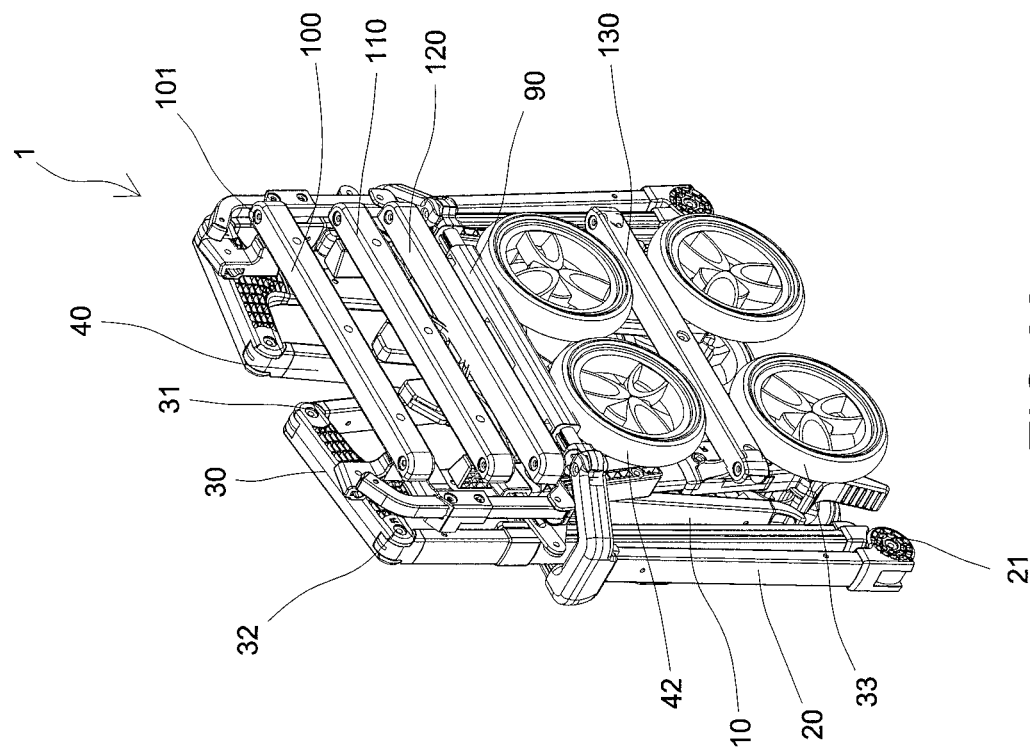
FIG. 22 shows a three-dimensional rear view of the flipping operation of the present invention.
Figure 21:
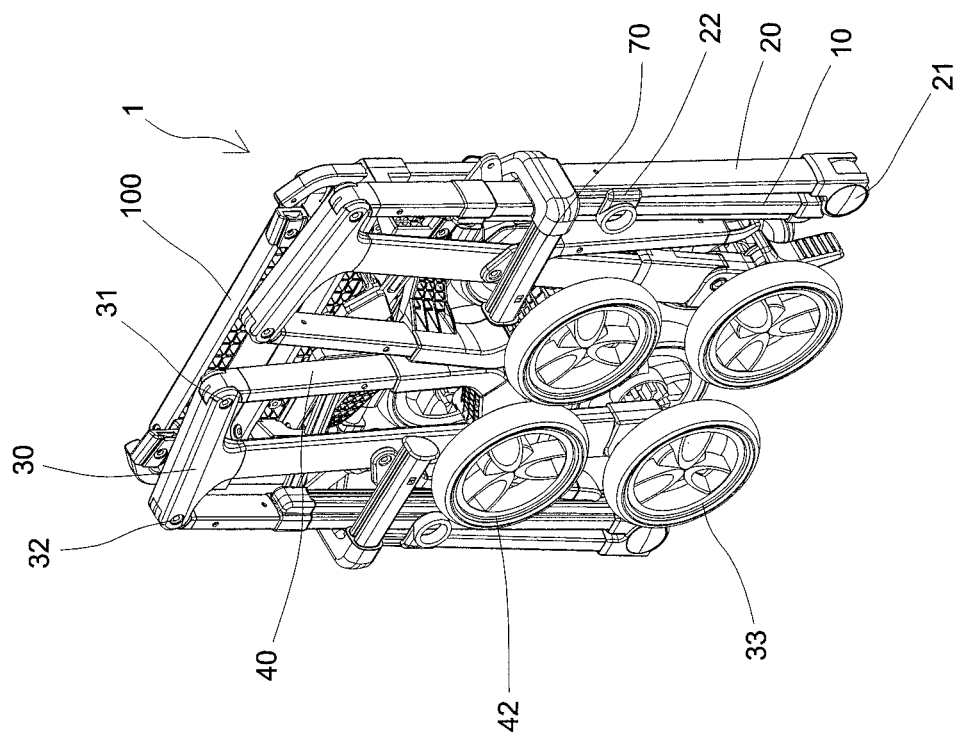
FIG. 21 shows a three-dimensional front view of the flipping operation of the present invention.

By the abovementioned structures, the folding operation in FIG. 1, FIG. 2 and FIG. 6 includes manually moving the sliding shaft ring 22 upward to release the pivoting head 21, with that the sliding shaft ring 22 links simultaneously with the rope 23. Next, the latch bolt 112 is pulled to escape from the latch groove 1201, and then the upper pushing rod 20 can be turned upward from the middle pushing rod 10. As shown in FIG. 10, the side sliding rod 60 is pulled down next, allowing the top end 62 (the transversal pillar at the T-end) of the side sliding rod 60 to escape into the locating groove 14 and cross over the slope 15. When the middle pushing rod 10 is pressed down, the top end 62 of the side sliding rod 60 will enter into the dovetail groove 16 and slide along with the dovetail groove 16. It means that the top end 62 of the side sliding rod 60 will slide following the middle pushing rod 10 by the sliding mechanism 600. As shown in FIGS. 11 to 14, the middle pushing rod 10 is turned downward against the first pivoting axis 31, and the front wheel rod 40 is turned downward against the second pivoting axis 32; whereas, at the same time, the bending-extension rod 50 is indented inward and bended, and the seat bottom rod 100 moves upward to get closer. A U-shaped body is formed when the middle pushing rod 10, the front wheel rod 40, the bending-extension rod 50 and the seat bottom rod 100 get close together (as shown in FIGS. 15 to 18). At this time, the seat bottom rod 100, the bottom connecting rod 110, the front wheel bottom rod 120, the top pushing rod 90 and the rear wheel bottom rod 130 are arranged parallel from top to bottom orderly; whereas, the seat bottom rod 100, the bottom connecting rod 110, the front wheel bottom rod 120, the top pushing rod 90 and the rear wheel bottom rod 130 manifest a coplanar state from top to bottom. Next, the seat side bending rods 80 at two sides of the baby carriage 1 are flipped inward against the seat flipping axes 101 (i.e., flipping inward at 90°), the bending-extension rods 50 at two sides of the baby carriage 1 are flipped inward against the bottom flipping axes 111, the front wheel rods 40 and the front wheels 42 at two sides of the baby carriage 1 are flipped inward against the front wheel flipping axes 121, the handles 70 at two sides of the baby carriage 1 are flipped inward against the top flipping axes 71, and the middle sections of the T-rods 30 and the rear wheels 33 at two sides of the baby carriage 1 are flipped inward against the rear wheel flipping axes 131, so that the seat side bending rods 80, the bending-extension rods 50, the front wheel rods 40, the front wheels 42, the handles 70, the middle sections of the T-rods 30 and the rear wheels 33 are flipped inward altogether, thereby forming a flat and rectangular body (as shown in FIGS. 19 to 22).

After folding and flipping, when the present invention is to be unfolded, a caregiver only needs to counter operate, flipping outward the seat side bending rods 80, the bending-extension rods 50, the front wheel rods 40, the front wheels 42, the handles 70, the middle sections of the T-rods 30 and the rear wheels 33 to turn the flat and rectangular body into the U-shaped body. Next, the caregiver pulls up the upper pushing rods 20, the middle pushing rods 10 and the front wheel rods 40, and then the baby carriage 1 can be unfolded. In addition, by the linking among all rods, the top end 62 of the side sliding rod 60 is moved back into the locating groove 14 to position the side sliding rod 60 by exerting a force on the side sliding rod 60 to cross over the slope 15 in the dovetail groove 16 of the middle pushing rod 10. When the upper pushing rod 20 is pressed down and restores to be on a same straight line with the middle pushing rod 10, the latch bolt 112 in the pivoting head 21 will rotate relatively to the latch groove 1201 of the pivoting ring 12 and will be engaged in the latch groove 1201 by the elastic force of the spring 1101, which positions the upper pushing rod 20 on the middle pushing rod 10 to form a straight line, thereby accomplishing the unfolding of the baby carriage 1.

The present invention gets rid of the shortcoming in a conventional baby carriage that it can be only folded and cannot be flipped inward anymore. By the present invention, the baby carriage 1 can be folded and then flipped inward, resulting in the much smaller size than the conventional baby carriage after folding. As the length, width or height of the baby carriage 1 after folding is decreased significantly, the baby carriage 1 can be transported, collected and carried easily. In addition, the folding operation is simple and convenient without requiring a complicated operating procedure. Furthermore, the baby carriage 1 will have the same function as that of an ordinary baby carriage after unfolding.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A collapsible baby carriage comprising:
   a pair of middle pushing rods, a pair of upper pushing rods, a pair of T-rods, a pair of front wheel rods, a pair of bending-extension rods, a pair of side sliding rods, a pair of handles and a pair of seat side bending rods at two sides of the baby carriage;
   wherein a front section of the bending-extension rods are extensible, a rear section of the bending-extension rods are bendable, the seat side bending rods are bendable, a front end of the seat side bending rods are provided with a socket;
   a top pushing rod, a seat bottom rod, a bottom connecting rod, a front wheel bottom rod and a rear wheel bottom rod are further disposed between the two sides of the baby carriage;
   wherein the collapsible baby carriage further includes a folding mechanism and a flipping mechanism, the folding mechanism is provided with a pair of pivoting heads, a pair of first pivoting axes, a pair of second pivoting axes, a pair of third pivoting axes and the pair of bending-extension rods, the pivoting heads are disposed above the middle pushing rods to pivot with the upper pushing rod, a top of each upper pushing rod is connected with each respective top pushing rod, two ends of the top pushing rods are pivoted respectively with the handles, each upper pushing rod is provided with a sliding shaft ring, and each pivoting head is released by moving the respective sliding shaft ring, allowing the upper pushing rods and the middle pushing rods to turn relative to each other;

an end of the T-rods being provided with the first pivoting axis to pivot with the middle pushing rods, allowing the middle pushing rods to be pressed down and turned from the T-rods;

another end of the T-rods being provided with the second pivoting axis to pivot with the front wheel rod, allowing the front wheel rod to turn downward from the T-rods;

a middle section at a tail end of the T-rods being provided with the third pivoting axis to pivot with the side sliding rods, a bottom of the T-rods being pivoted with a rear wheel, a tail end of the front wheel rods being pivoted with a front wheel, the front wheel bottom rod being disposed between the two front wheel rods, the front wheel bottom rod and an interior side at the middle section of the T-rods being pivoted with the bending-extension rods, the bottom connecting rod being disposed between the two bending-extension rods, and the rear wheel bottom rod being disposed between the two T-rods;

a stopping piece being disposed near a lower end of each middle pushing rod;

a sliding mechanism being disposed between a top end of the side sliding rods and the middle pushing rods, the top end of the side sliding rods sliding following the middle pushing rods and being stopped upon reaching the stopping piece, an interior side of the side sliding rods being pivoted with the seat side bending rods, and the seat bottom rod being pivoted between the two seat side bending rods;

the flipping mechanism being provided with a set of top flipping axes, a set of seat flipping axes, a set of bottom flipping axes, a set of front wheel flipping axes and a set of rear wheel flipping axes;

the top flipping axes being disposed between the top pushing rod and the handles, the seat flipping axes being disposed between the seat side bending rods and the seat bottom rod, the bottom flipping axes being disposed between the bending-extension rods and the bottom connecting rod, the front wheel flipping axes being disposed between the front wheel bottom rod and the front wheel rods, and the rear wheel flipping axes being disposed between the T-rods and the rear wheel bottom rod;

accordingly, the pivoting heads being released by moving the sliding shaft rings, allowing the upper pushing rods to turn upward;

the top end of the side sliding rods sliding following the middle pushing rod by the sliding mechanisms, the middle pushing rods being turned down by the first pivoting axis, and the front wheel rods being turned down by the second pivoting axis;

the upper pushing rods, the side sliding rods, the middle pushing rods and the front wheel rods getting closer together to form a U-shaped body when the baby carriage is collapsed;

the seat bottom rod, the bottom connecting rod, the front wheel bottom rod, the top pushing rod and the rear wheel bottom rod being arranged parallel to one another from top to bottom order when the baby carriage is collapsed, and the seat side bending rods, the bending-extension rods, the front wheel rods, the front wheels, the handles, the middle section of the T-rods and the rear wheels being flipped inward altogether against the seat flipping axes, the bottom flipping axes, the front wheel flipping axes, the top flipping axes and the rear wheel flipping axes to form a flat and rectangular body when the baby carriage is collapsed.

2. The collapsible baby carriage according to claim 1, wherein the upper pushing rod is provided with a slot hole for movement of the sliding shaft ring, the sliding shaft ring is fixed with a rope, a shaft tube is disposed between the upper pushing rod and the middle pushing rod, an end of the shaft tube is fixed in the upper pushing rod, another end of the shaft tube is connected with the middle pushing rod by the pivoting head, the middle pushing rod is provided with a pivoting ring to pivot with the pivoting head, the pivoting ring is provided with a latch groove, an interior of the shaft tube is provided with a spring and a latch bolt, the latch bolt is connected with the rope, the spring enables the latch bolt to restore to an original position, the latch bolt is engaged in the latch groove, and the latch bolt is released and escaped from the latch groove by pulling the sliding shaft ring, allowing the upper pushing rod to be flipped upward from the middle pushing rod.

3. The collapsible baby carriage according to claim 1, wherein a side of the middle pushing rod in the sliding mechanism is provided with a locating groove, a slope and a dovetail groove in a shape of a long strip, with that the depth of the locating groove is lower than the dovetail groove, the slope is higher than the locating groove, a top end of the side sliding rod is a T-end entering into the dovetail groove, and a head of the T-end is a transversal pillar which is positioned in the locating groove.

4. The collapsible baby carriage according to claim 1, wherein the stopping piece near a lower end of the middle pushing rod is a sleeve which encloses the middle pushing rod, and is exposed out of the middle pushing rod.

5. The collapsible baby carriage according to claim 1, wherein each side of the front wheel bottom rod is provided with an arm extension, and the front wheel flipping axes are pivoted between the front wheel bottom rod and the two arm extensions at two sides of the front wheel rods.

* * * * *